Nov. 25, 1947.  W. E. WINE  2,431,599
TRACTION DEVICE
Filed May 26, 1943  2 Sheets-Sheet 1
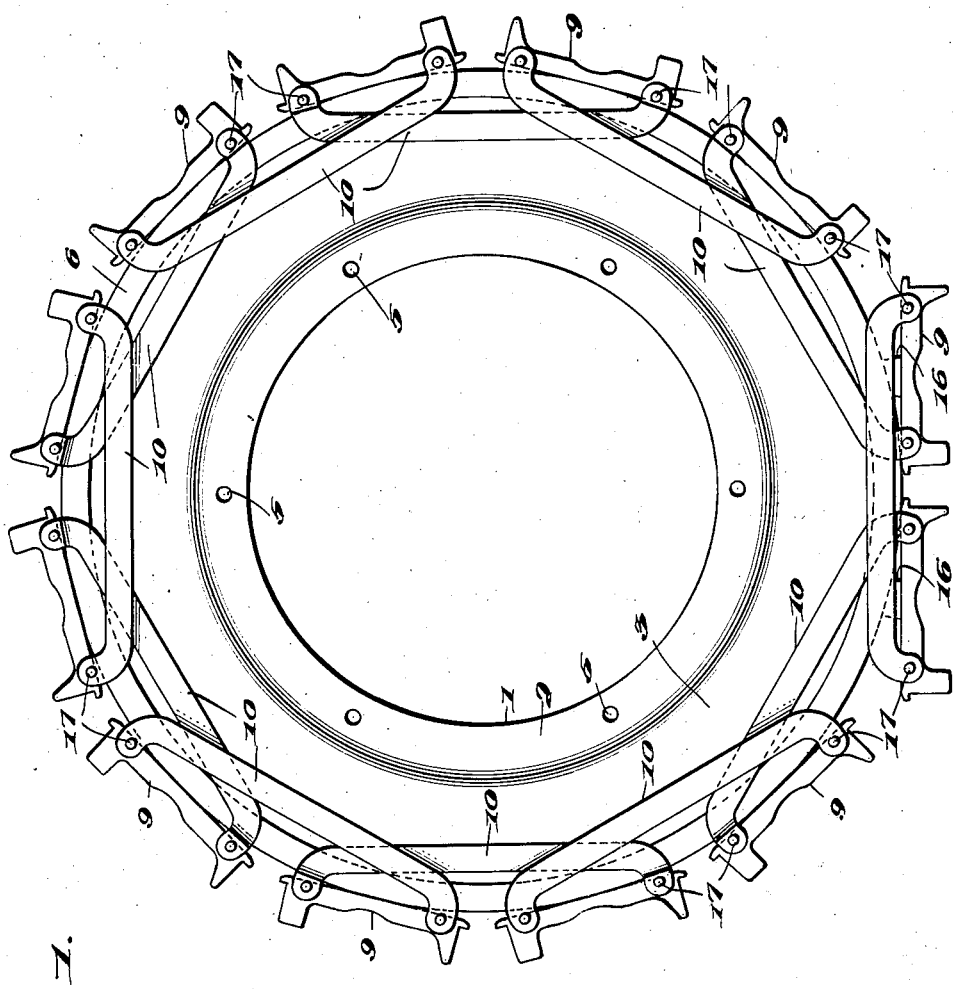

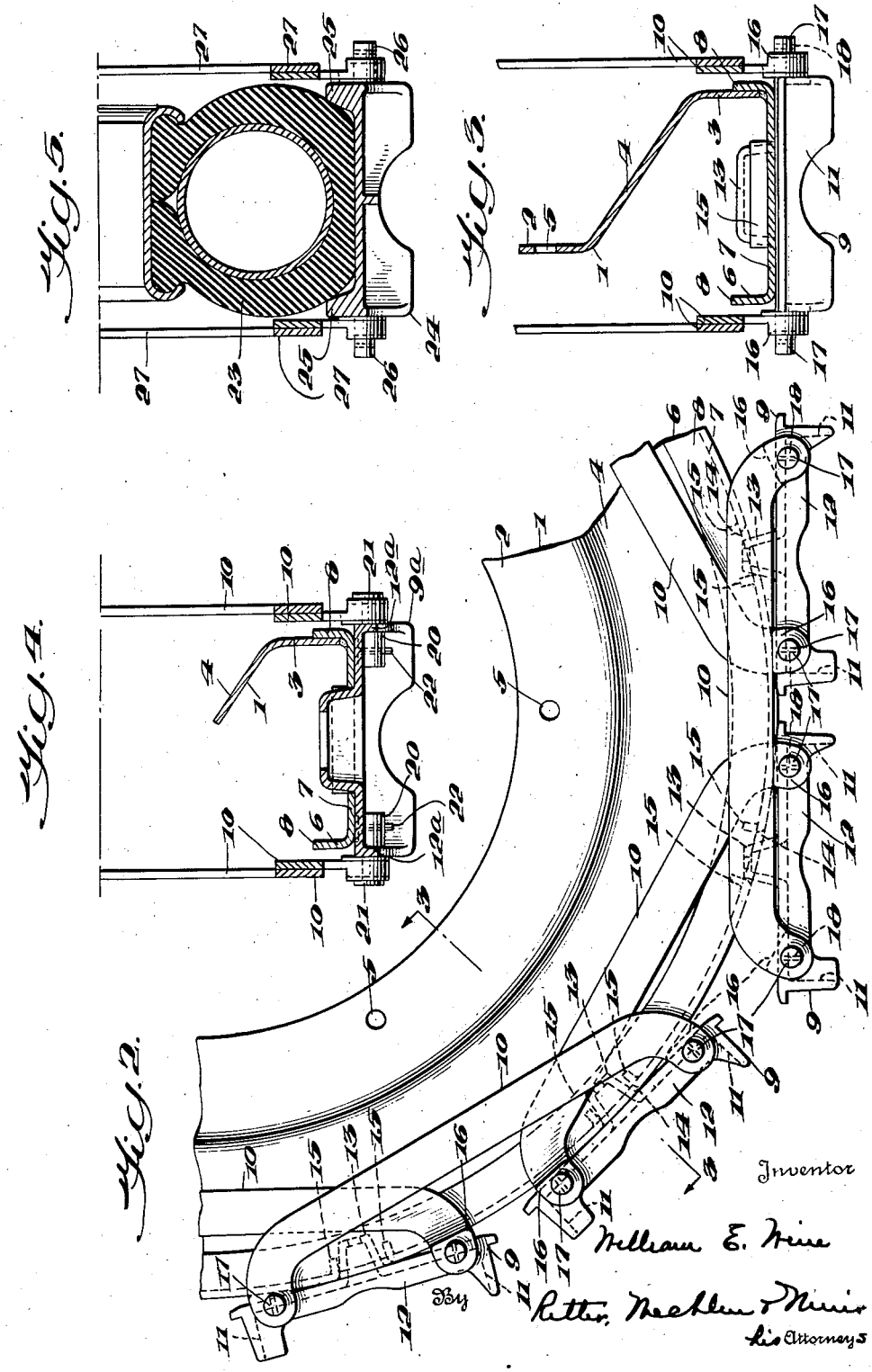

Patented Nov. 25, 1947

2,431,599

UNITED STATES PATENT OFFICE 2,431,599

TRACTION DEVICE

William E. Wine, Toledo, Ohio

Application May 26, 1943, Serial No. 488,581

8 Claims. (Cl. 305—13)

My invention relates to traction devices and it has for its principal object the provision of a simple and rugged traction device which is adapted to encircle a wheel and to form the tread portion thereof.

A primary feature of the invention consists in providing such a traction device with a plurality of ground engaging shoes and links arranged on opposite sides of the wheel which pivotally connect the remote ends of successive shoes.

Another feature of the invention consists in movably connecting a plurality of ground engaging shoes with links arranged on opposite sides of the wheel and pivotally connected to each end of each shoe, the links on each side of the wheel connected to each shoe being arranged in lapping relation and being respectively provided with means for limiting the extent of relative movement between the links and the associated shoe.

A further feature of the invention consists in providing the ground engaging shoes which form the tread portion of the wheel with means cooperable with the rim of the wheel for preventing the shoes from moving circumferentially thereof.

Other and more specific features of the invention, residing in advantageous forms, combinations and relations of parts will hereinafter appear and be pointed out in the claims.

In the drawings,

Figure 1 is a side elevational view of a portion of a wheel illustrating one embodiment of the traction device forming the subject-matter of the present invention.

Figure 2 is an enlarged side elevational view of a portion of the structure illustrated in Figure 1.

Figure 3 is a detail sectional view taken on line 3—3 of Figure 2.

Figure 4 is a transverse sectional view illustrating a modified form of the invention.

Figure 5 is a transverse sectional view illustrating another form of the invention as applied to a wheel having a pneumatic tire.

Referring more particularly to the drawings, the invention is shown in Figures 1 to 3, inclusive, as applied to a wheel of the disk type. The particular wheel which has been chosen merely for illustrative purposes comprises an annular plate or disk 1 having inner and outer flanges 2 and 3 respectively which are connected by an inclined web portion 4. The inner flange 2 is formed with a plurality of apertures 5 for receiving bolts or the like (not shown) for connecting the disk 1 to an axle or other wheel supporting member (not shown).

The outer flange 3 of the disk affords convenient means to which the rim 6 of the wheel may be welded or otherwise secured. The rim may be advantageously of channel-shape in cross section having a web portion 7 and inwardly projecting marginal flanges 8, to one of which the outer flange 3 of the disk is secured.

The traction device which is adapted to encircle the wheel and to form the tread portion thereof consists of a plurality of ground engaging shoes 9 which are movably connected by a plurality of pairs of links 10. Each of the shoes 9 is preferably of plate-like form and is provided with transverse ribs or teeth 11 adjacent its opposite ends which are adapted to bite into the ground. The shoes are also preferably reinforced by longitudinally extending flanges 12 which may be conveniently located at the side edges of the shoes.

Adjacent their central portions, the shoes are respectively provided, preferably integrally, with inwardly projecting lugs or teeth 13 which are adapted to extend into properly located apertures 14 formed in the web portion 7 of the rim 6 of the wheel. The apertures in the rim may be advantageously formed by cutting or slitting the web and then bending portions thereof inwardly so as to form flanges or walls 15 which serve to rigidify the edges of the openings. The lugs 13 on the shoes preferably taper inwardly so as to easily fit within the openings in the rim and they, of course, function to prevent the shoes from slipping or creeping circumferentially around the wheels as well as axially of the wheel.

A pair of the links 10 is pivotally connected to each shoe adjacent each end thereof and the links of each pair are arranged on opposite sides of the wheel. The links on each side of the wheel are arranged in lapping relation and each is pivotally connected to the opposite end of an adjacent shoe, that is to say, they pivotally connect the remote ends of successive shoes.

Each end of each link is formed with a laterally projecting lug or the like 16 which functions to cooperate with an intermediate portion of an adjacent link for limiting the extent of pivotal movement between each shoe and the links connected thereto. While all of the links are preferably identical, the ones which are nearest the wheel and which may therefore be termed the inner links are applied to the shoes so that their lugs 16 extend outwardly, while the other links which may be termed the outer links are applied to the shoes so that their lugs extend inwardly. In this manner, the lugs of each link are capable of cooperating with portions of adjacent links for limiting the extent of pivotal movement between the shoes and links.

In the form of the invention illustrated in Figures 1 to 3, inclusive, the pivotal connection between the links and shoes is effected by providing the shoes with laterally projecting integral bosses 17 which fit within the apertured ends of the links. The links may be prevented from slipping off of the bosses by cotter pins or other suitable means which may be conveniently inserted in transverse openings 18 with which the bosses are formed.

The shoes and links are preferably so proportioned that, when the traction device is assembled on the wheel, there will be sufficient slack in it that, as the shoes are successively brought into engagement with the ground during rotation of the wheel, two of them are enabled as a result of engagement with the ground to angle with respect to the wheel the maximum amount permitted by the lugs 16 on the links. Slack sufficient to enable more than two links to angle the maximum permissible amount may be provided but this will be found unnecessary as it is seldom that the load of the wheel is imparted at any instant to more than two shoes.

In the form of the invention illustrated in Figure 4 showing a different means for pivotally connecting the links and shoes, the wheel and links there illustrated are of the same construction as shown in Figures 1 to 3, inclusive, and corresponding parts are, therefore, designated by the same reference numerals. The shoes 9a, while being formed to interlock with the rim in the same manner as the shoes shown in Figures 1 to 3, inclusive, are of modified construction in that instead of having the integral bosses with which the links are pivotally associated, they are provided with removable pins 20 for pivotally connecting the links thereto. The pins extend into openings formed in the side flanges 12a of the shoes and at their outer ends they are headed as at 21 to overlap adjacent portions of the outer faces of the links. At their inner ends, the pins are formed with transverse openings adapted to register with openings in the base of the shoe to receive cotter pins 22 or other suitable means for removably securing the pins to the shoes. The cotter pins shown in Figure 4 of the drawings are preferably formed with flat heads countersunk in the inner face of the shoe so that the latter will present a smooth surface.

In Figure 5 the invention is shown as applied to a wheel having a pneumatic tire generally designated by the reference numeral 23. In this form of the invention, the shoes 24 are unprovided with any lug corresponding to the driving lug 13 with which the shoes 9 are formed but the friction between rubber and metal is so much greater than between metal and metal that no substantial slippage of the shoes circumferentially of the pneumatic tire will occur. The shoes 24, however, are preferably formed with inwardly extending marginal flanges 25 which are adapted to overlap the side walls of the tire and prevent the shoes from shifting sidewise.

Like the shoes 9, shoes 24 are integrally formed with laterally projecting bosses to which the links 27 of the same construction as the links 10 are pivotally connected. The links 27 are pivotally associated with the shoes in the same manner as the links 10 are associated with shoes 9 of Figures 1 to 3, inclusive, and they cooperate with each other as do the links 10 for limiting the extent of pivotal movement between the shoes and links.

From the foregoing, it will be perceived that a very simple and yet extremely rugged traction device has been devised which may be easily applied to most any type of wheel. Various modifications and changes in the details illustrated of the different embodiments of the invention here described may, of course, be made without departing from the spirit and scope of the invention as defined in the appended claims.

What I claim is:

1. A traction device adapted to encircle a wheel and form the tread portion thereof, said device comprising a plurality of plate-like ground engaging shoes, and rigid links arranged on opposite sides of the wheel for pivotally connecting said shoes together independently of said wheel, each of said rigid links having its opposite ends pivotally secured to the remote ends of successive shoes.

2. A traction device adapted to encircle a wheel and form the tread portion thereof, said device comprising a plurality of ground engaging shoes, and a pair of rigid links pivotally connected to each shoe adjacent each end thereof for joining the shoes together independently of the wheel, the links of each pair being arranged in overlapping relation with the sides of the wheel and each of said links being pivotally connected to the opposite ends of adjoining shoes.

3. A traction device adapted to encircle a wheel and form the tread portion thereof, said device comprising a plurality of ground engaging shoes, and rigid links arranged on opposite sides of the wheel for pivotally connecting said shoes independently of said wheel, said rigid links being arranged in lapping relation on each side of the wheel and each link having its opposite end pivotally connected to the remote ends of adjoining shoes.

4. A traction device adapted to encircle a wheel and form the tread portion thereof, said device comprising a plurality of ground engaging shoes, and rigid links arranged on opposite sides of the wheel for pivotally connecting said shoes together independently of the wheel, each of said rigid links having its opposite ends pivotally connected to the remote ends of successive shoes.

5. A traction unit adapted to form the peripheral portion of a tractor wheel, said unit including a rim element, a plurality of ground engaging shoes encircling the rim element and constituting the tread portion of the wheel, rigid links movably holding said shoes on the rim element, said links being arranged on opposite sides of the rim element and each having its opposite ends pivotally connected to remote ends of successive shoes, and means interlocking said shoes with the rim element for limiting movement of the shoes circumferentially of the rim.

6. A traction unit adapted to form the peripheral portion of a tractor wheel, said unit including a rim element, a plurality of ground engaging shoes encircling the rim elements constituting the tread of the wheel, a plurality of pairs of rigid links movably connecting the shoes together and to the rim element, the links of each pair being arranged on opposite sides of the rim element and each pair of links being pivotally connected to the remote ends of successive shoes, and means rigid with each shoe and projecting inwardly therefrom for coacting with the rim element for limiting movement of the shoes circumferentially of the rim.

7. A traction unit adapted to form the peripheral portion of a tractor wheel, said unit including a rim element provided with a plurality of openings, a plurality of ground engaging shoes encircling the rim element constituting the tread portion of the wheel, rigid links movably connecting said shoes to the rim element, said links being arranged on opposite sides of the rim element and each being pivotally connected to the remote end of successive shoes, said shoes being respectively provided with inwardly projecting lugs extending into said openings in the rim element for limiting movement of the shoes circumferentially of the rim element.

8. A traction device for a wheel having a pneumatic tire, said device being adapted to encircle the tire and to form the tread portion of the wheel and comprising a plurality of plate-like ground engaging shoes provided with laterally spaced flanges adapted to overlap the sides of the tire, and rigid links arranged on opposite sides of the tire pivotally connecting said shoes, each of said links being pivotally connected to the remote ends of successive shoes.

WILLIAM E. WINE.

REFERENCES CITED

The following references are of record in the file of this patent:

UNITED STATES PATENTS

| Number | Name | Date |
|---|---|---|
| 1,220,852 | Johnson | Mar. 27, 1917 |
| 1,297,493 | Reid | Mar. 18, 1919 |
| 1,309,633 | Johnson | July 15, 1919 |
| 1,228,024 | Johnson | May 29, 1917 |
| 2,179,587 | Deardoff | Nov. 14, 1939 |